US011345093B2

(12) United States Patent
Greene et al.

(10) Patent No.: US 11,345,093 B2
(45) Date of Patent: May 31, 2022

(54) SYSTEM AND METHOD OF DETECTING FAILED BED ADHESION FOR A THREE-DIMENSIONAL PRINTER

(71) Applicant: Essentium Inc., Pflugerville, TX (US)

(72) Inventors: Jason Greene, Huntington Beach, CA (US); Chad Eichele, Lake Forest, CA (US)

(73) Assignee: Essentium, Inc., Pflugerville, TX (US)

( * ) Notice: Subject to any disclaimer, the term of this patent is extended or adjusted under 35 U.S.C. 154(b) by 118 days.

(21) Appl. No.: 16/879,850

(22) Filed: May 21, 2020

(65) Prior Publication Data

US 2021/0362430 A1 Nov. 25, 2021

(51) Int. Cl.
*B29C 64/393* (2017.01)
*B29C 64/25* (2017.01)
(Continued)

(52) U.S. Cl.
CPC .......... *B29C 64/393* (2017.08); *B29C 64/118* (2017.08); *B29C 64/209* (2017.08); *B29C 64/227* (2017.08); *B29C 64/245* (2017.08); *B29C 64/25* (2017.08); *B29C 64/321* (2017.08); *B33Y 10/00* (2014.12); *B33Y 30/00* (2014.12); *B33Y 50/02* (2014.12)

(58) Field of Classification Search
CPC ... B29C 64/393; B29C 64/118; B29C 64/209; B29C 64/227; B29C 64/245; B29C 64/25; B29C 64/321
See application file for complete search history.

(56) References Cited

U.S. PATENT DOCUMENTS

| 2017/0050383 A1 | 2/2017 | Bell et al. |
| 2017/0136707 A1 | 5/2017 | Batchelder et al. |
| 2019/0271635 A1 | 9/2019 | Saha et al. |

FOREIGN PATENT DOCUMENTS

| CN | 102601977 A | 7/2012 |
| CN | 109676137 A | 4/2019 |

(Continued)

OTHER PUBLICATIONS

International Searching Authority. International Search Report and Written Opinion for PCT Application No. PCT/US2021/029145, dated Sep. 15, 2021, pp. 1-7.

*Primary Examiner* — Joseph S Del Sole
*Assistant Examiner* — Mohamed K Ahmed Ali
(74) *Attorney, Agent, or Firm* — Vivacqua Crane, PLLC (57) ABSTRACT

A three-dimensional printer includes an enclosure defining a chamber and a print surface disposed within the chamber. The printer further includes a nozzle displaceable relative to the print surface for melting and dispensing a filament on the print surface to form a dielectric part during a printing process. The printer further includes a filament drive system for supplying the filament to the nozzle, and one or more capacitance sensors coupled to the print surface. The printer further includes a controller electrically coupled to the capacitance sensors for measuring a capacitance, with the controller generating an error signal in response to the controller determining a change of capacitance when the dielectric part is displaced relative to the print surface during the printing process. The printer further includes a display device electrically coupled to the controller and displaying an error message in response to the display device receiving the error signal.

20 Claims, 3 Drawing Sheets

(51) Int. Cl.
  *B29C 64/245* (2017.01)
  *B29C 64/209* (2017.01)
  *B29C 64/227* (2017.01)
  *B29C 64/321* (2017.01)
  *B29C 64/118* (2017.01)
  *B33Y 50/02* (2015.01)
  *B33Y 10/00* (2015.01)
  *B33Y 30/00* (2015.01)

(56) References Cited

FOREIGN PATENT DOCUMENTS

| | | |
|---|---|---|
| CN | 110394986 A | 11/2019 |
| WO | 2019182989 A1 | 9/2019 |

SYSTEM AND METHOD OF DETECTING FAILED BED ADHESION FOR A THREE-DIMENSIONAL PRINTER

TECHNICAL FIELD

The present disclosure relates to three-dimensional printers for printing parts on a print bed, and more particularly to a system and method of detecting failed adhesion between the part and the print bed.

BACKGROUND

Three-dimensional printers ("3D printers") produce three-dimensional parts from computer generated models. The printers deposit feed stock on a print bed during an additive manufacturing process. In some instances, the filament may be include a printer head that draws the feedstock in the form of thermoplastic filament from a spool contained within a canister. The printer head may move along path while heating and depositing the filament onto the print bed to form the part. For example, the printer head may move within an XY plane and deposit the filament in a first layer, and the printer head and/or the print bed may be moved along a Z-axis to form a successive layer. This process may then be repeated until the entire part is completed.

One exemplary challenge in the additive manufacturing process is that the part may separate from the print bed, and the printer head may drag the part along the print bed before the entire part has been printed. The failed adhesion between the part and the print bed can cause the printed part to deviate from design requirements, which can in turn require the part to be re-printed and waste material.

Thus, while current 3D printers achieve their intended purpose, there is a need for a new and improved 3D printer that addresses these issues.

SUMMARY

The present disclosure provides a three-dimensional printer including an enclosure that defines a chamber and a print surface disposed within the chamber. The printer further includes a nozzle displaceable relative to the print surface for melting and dispensing a filament on the print surface to form a dielectric part during a printing process. The printer further includes a filament drive system for supplying the filament to the nozzle, and one or more capacitance sensors coupled to the print surface. The printer further includes a controller electrically coupled to the capacitance sensors for measuring a capacitance during the print process. The controller determines a change of capacitance in response to the dielectric part being displaced relative to the print surface during the printing process. The controller generates an error signal in response to the controller determining the change of capacitance. The printer further includes a display device electrically coupled to the controller and displaying an error message in response to the display device receiving the error signal from the controller.

The present disclosure also provides a three-dimensional printer including an enclosure that defines a chamber. The printer further includes a print surface disposed within the chamber and having a plurality of sections. The printer further includes a nozzle displaceable relative to the print surface for melting and dispensing a filament on the sections of the print surface to form at least one dielectric part during a printing process. The printer further includes a filament drive system for supplying the filament to the nozzle and a plurality of capacitance sensors coupled to the associated sections of the print surface. The printer further includes a controller electrically coupled to the plurality of capacitance sensors for measuring a capacitance for the associated sections of the print surface during the print process. The controller determines a change of capacitance in response to an associated portion of the dielectric part being displaced relative to the associated section of the print surface during the print process. The controller generates an error signal in response to the controller detecting the change of capacitance. The printer further includes a display device electrically coupled to the controller and displaying an error message in response to the display device receiving the error signal from the controller.

The present disclosure also provides a method of operating a three-dimensional printer having an enclosure, a print surface disposed within the enclosure, a nozzle, a filament drive system, at least one capacitance sensor, a controller electrically coupled to the capacitance sensors, and a display device. The method includes the filament drive system supplying a filament to the nozzle. The nozzle is displaced relative to the print surface for melting and dispensing the filament onto the print surface to form a dielectric part on the print surface during a printing process. The controller and the capacitance sensor measure a capacitance during the print process. The controller determines a change of capacitance in response to the dielectric part being displaced relative to the print surface during the printing process. The controller generates an error signal in response to the controller determining the change of capacitance. The display device displays an error message in response to the display device receiving the error signal from the controller.

Other features and advantages of the present disclosure will be readily appreciated, as the same becomes better understood, after reading the subsequent description taken in conjunction with the accompanying drawings.

DRAWINGS

Advantages of the present disclosure will be readily appreciated as the same becomes better understood by reference to the following detailed description when considered in connection with the accompanying drawings.

DETAILED DESCRIPTION

The following description is merely exemplary in nature and is not intended to limit the present disclosure, application, or uses.

Figure 1:
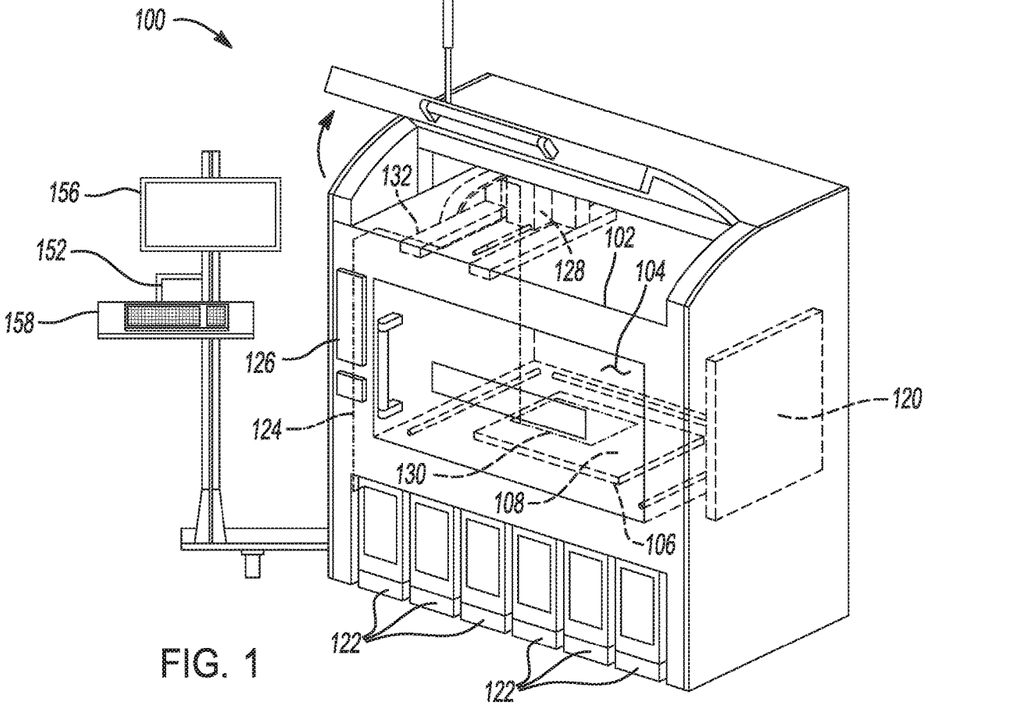
FIG. 1 is a perspective view of a three-dimensional printer, illustrating the printer having an enclosure defining a chamber and a print bed disposed within the chamber.

Referring to FIG. 1, one example of a three-dimensional printer 100 includes an enclosure 102 defining a chamber 104 and a print bed 106 disposed within the chamber 104. The print bed 106 has a print surface 108 with a section 110 (FIGS. 2 and 3) upon which a dielectric part 130 is printed. In this example, the print bed 106 is a composite panel 112 (FIGS. 2 and 3) including a substrate 114 disposed between two composite layers 116, 118, with one of the composite layers 116, 118 including the print surface 108. The substrate 114 and composite layers 116, 118 can be made of Fiberglass-epoxy laminate material. In other examples, the print bed can be made of other materials and have any number of layers. The printer 100 further includes a Z-motor system 120 for linearly moving the print surface 108 along a Z-axis.

The printer 100 further includes one or more canisters 122 for storing a filament 124 and a filament drive system 126 for drawing one or more filaments 124 from the associated canisters 122. While FIG. 1 illustrates the filament drive system 126 drawing only one filament 124 from one canister, it is contemplated that the filament drive system 126 can engage two or more filaments dispensed from any number of canisters 122. Other examples of the printer can include other delivery mechanisms for delivering filament or non-filament feedstock from any suitable storage device to the print surface.

The printer 100 further includes a nozzle 128 for receiving the filament 124 from the filament drive system 126, heating the filament 124, moving relative to the print surface 108, and dispensing the filament 124 on one or more sections 110 of the print surface 108 to form one or more dielectric parts 130 during a printing process. The printer 100 includes an XY all-linear motor system 132 for moving the nozzle 128 within the XY plane to print the dielectric part 130 on the print surface 108. However, it is contemplated that either one or both of the nozzle 128 and the print surface can be movable in any suitable direction for 3D printing the part 130.

Referring again to FIGS. 2 and 3, the printer 100 further includes one or more capacitance sensors 134 coupled to the print surface 108. In this example, the printer 100 includes one capacitance sensor 134 coupled to the section 110 of the print surface 108. The capacitance sensor 134 is electrically coupled to a voltage source 136 having a positive terminal 138 and a negative terminal 140. The capacitance sensor 134 further includes a positive electrode 142 coupled to the positive terminal 138 and receiving a positive charge from the positive terminal 138. Each capacitance sensor 134 further includes a negative electrode 144 coupled to the voltage source 136 and receiving a negative charge from the voltage source 136. It is contemplated that the printer can include more than one capacitance sensor as detailed in the description of the examples illustrated in FIGS. 5 and 6.

Figure 2:
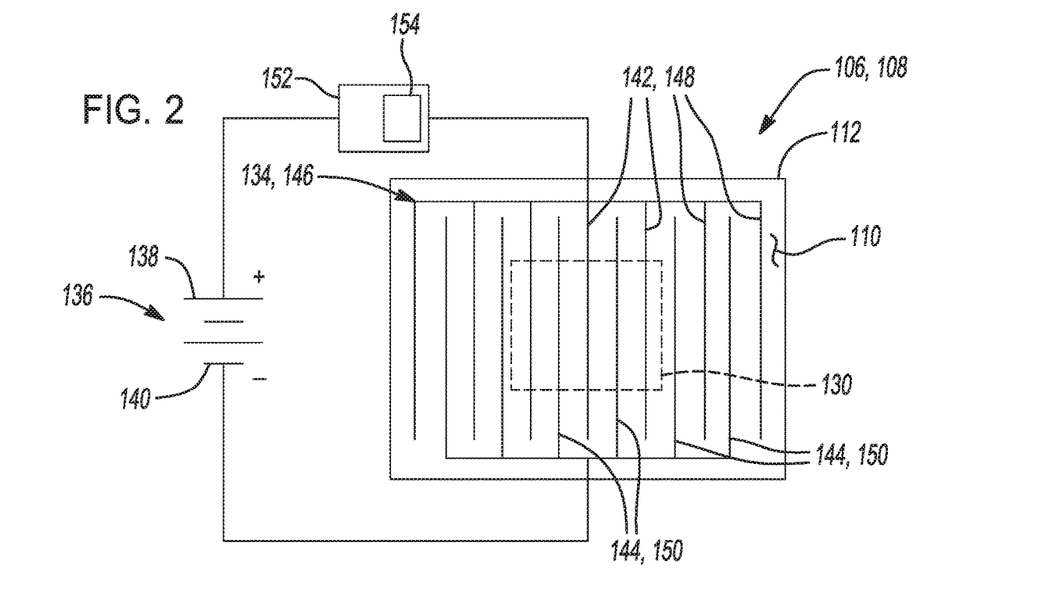
FIG. 2 is a plan view of the print bed of FIG. 1, illustrating the print bed having a single capacitance sensor with a plurality of fingers.
Figure 3:
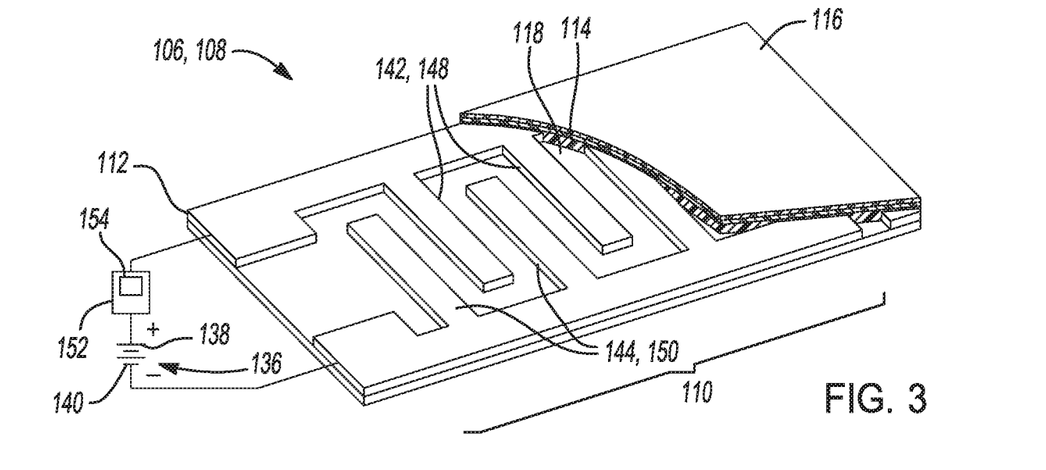
FIG. 3 is a cross-sectional view of the print bed of FIG. 2, illustrating the print bed having a substrate and composite layers on opposing sides of the substrate, with the capacitance sensor embedded within the substrate and one of the composite layers having a print surface upon which one or more parts are printed.

As best shown in FIG. 2, each of the positive and negative electrodes 142, 144 includes a plurality of fingers 148, 150 embedded within the substrate 114, with the fingers 148 of the positive electrode 142 being interdigitated with the fingers 150 of the negative electrode 144. However, it is contemplated that the printer can include any number of capacitors in the form of fingers, in-plane plates, or other suitable structures arranged in series or parallel.

Referring back to FIG. 1, the printer 100 further includes a controller 152 electrically coupled to the filament drive system 126, the XY-motor system 132, the nozzle 128, the Z-motor system 120 for actuating the same to 3D print the dielectric part 130. The controller 152 is further electrically coupled to the capacitance sensors 134 for measuring a capacitance for the associated sections 110 of the print surface 108 during the print process. In this example, the controller 152 includes an analog-to-digital converter 154 coupled to the capacitance sensors 134 for converting the capacitance to a voltage and then converting the voltage to digital. The controller 152 determines a change of capacitance, in response to the associated portion of the dielectric part 130 being displaced relative to the associated section 110 of the print surface 108 during the print process. The controller 152 generates an error signal, in response to the controller 152 detecting the change of capacitance. More specifically, the controller 152 is configured to generate the error signal, in response to the controller 152 determining that the change of capacitance is above a predetermined threshold. The threshold can be an empirically determined value. For instance, the threshold can be 20 picofarads where the controller 152 and associated capacitance sensor 134 measure a capacitance of 120-140 picofarads when a dielectric part adheres to an associated section 110 of the print surface 108 and a capacitance of 100 picofarads when the dielectric part separates from and moves relative to the associated section 110 of the print surface 108. While it is contemplated that the threshold can be above or below 20 picofarads and the feedstock and the print bed can be made of any suitable material with associated capacitance values above or below the range of 120-140 picofarads, the controller 152 still determines a change of capacitance in response to the part detaching from the print bed. The controller 152 is configured to not generate the error signal in response to the controller 152 determining that the change of capacitance is less than the predetermined threshold. The filament drive system 126 ceases supplying filament to nozzle 128, in response to the filament drive system 126 receiving the error signal from the controller 152.

As shown in FIG. 1, the printer 100 further includes a display device 156 electrically coupled to the controller 152 for displaying an error message in response to the display device 156 receiving the error signal from the controller 152. The technician can inspect the part 130 for any defect associated with the failed bed adhesion and determine whether the defect is repairable.

The printer 100 further includes a user interface 158 for generating a continue command signal and a stop command signal. The technician may operate the user interface 158 to generate the continue command signal in response to the technician determining that the defect of the part 130 associated with the error signal is repairable. The controller 152 can receive the continue signal from the user interface 158 for actuating the filament drive system 126, the nozzle, the XY-motor system 132, and the Z-motor system to continue printing the part 130 in response to the controller 152 receiving the continue command signal from the user interface 158. In addition, the technician may operate the user interface 158 to generate the stop command signal. The controller 152 can receive the all-stop signal from the user interface 158 for actuating the filament drive system 126, the nozzle, the XY-motor system 132, and the Z-motor system 120 to stop printing all parts.

Figure 4:
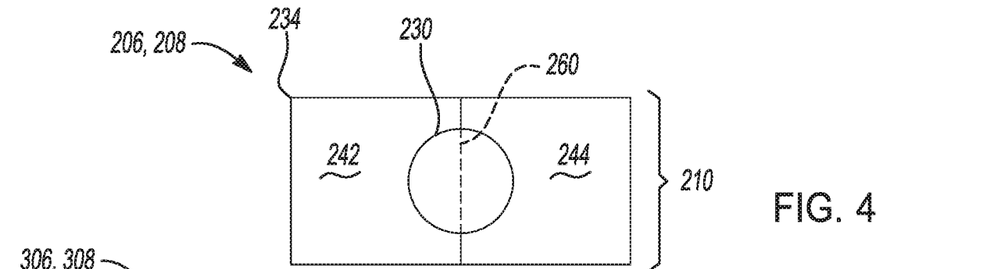
FIG. 4 is a plan view of another example of a print bed of FIG. 1, illustrating the print bed having a single capacitance sensor in the form of in-plane positive and negative electrode plates.

Referring to FIG. 4, another example of a print bed 206 is similar to the print bed 106 of FIG. 2 and includes similar components identified by the same reference numbers increased by 100. However, while the print bed 106 of FIG. 2 includes the capacitance sensor 134 with positive and negative electrodes 142, 144 in the form of interdigitated fingers 148, 150, the print bed 206 includes a single capacitance sensor 234 with positive and negative electrodes 242, 244 in the form of in-plane electrode plates that are positioned adjacent to one another within the substrate. The print surface 208 includes a seam 260 between the positive and negative electrodes 242, 244, such that dielectric filament formed across the seam 260 produces an associated capacitance.

Figure 5:
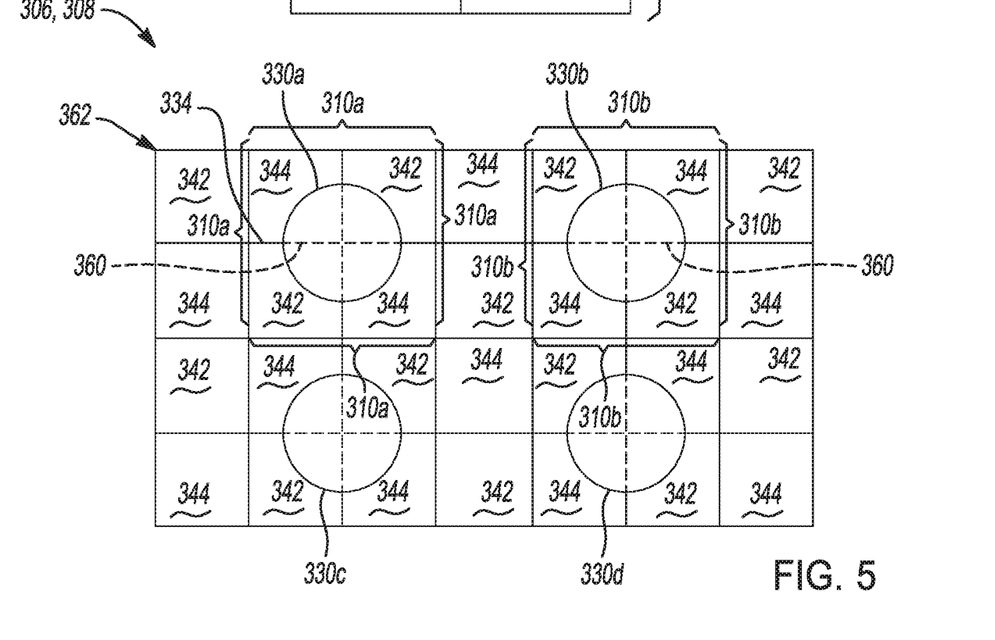
FIG. 5 is a plan view of still another example of a print bed of FIG. 1, illustrating the print bed having a plurality of capacitance sensors in the form of in-plane positive and negative electrode plates arranged in a matrix with a plurality of parts printed on the print surface.
Figure 6:
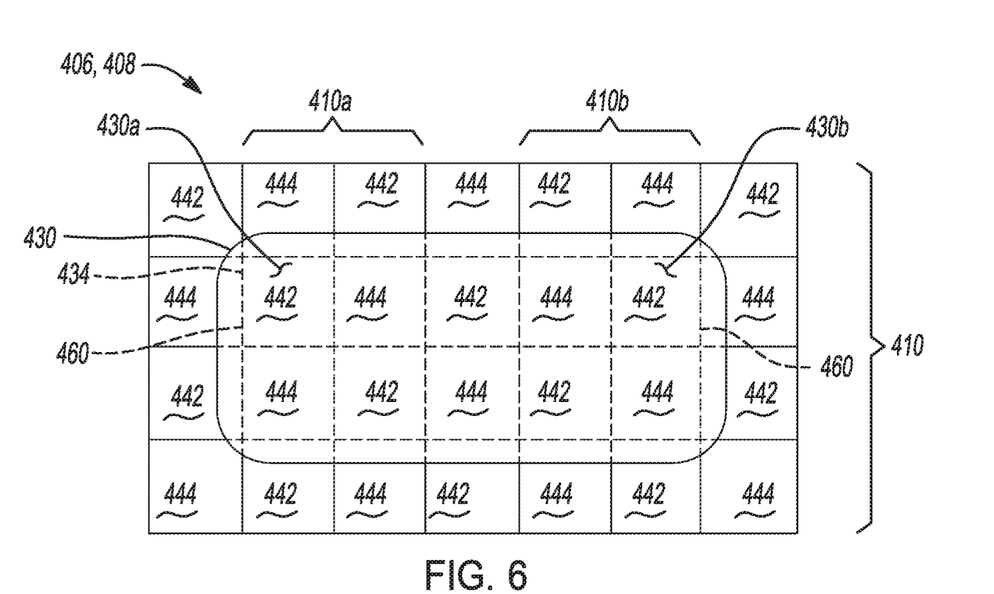
FIG. 6 is a plan view of still another example of a print bed of FIG. 1, illustrating the print bed having a plurality of capacitance sensors in the form of in-plane positive and negative electrode plates arranged in a matrix with a single part supported on the print surface.

Referring to FIG. 5, another example of a print bed 306 is similar to the print bed 106 of FIG. 2 and includes similar components identified by the same reference numbers increased by 200. However, while the print bed 106 of FIG. 2 has a single section 110 of the print surface 108 and a single capacitance sensor 134 with positive and negative electrodes 142, 144 in the form of interdigitated fingers 148, 150, the print bed 306 includes a plurality of sections 310 with a plurality of capacitance sensors 334 arranged in a matrix 362, with each capacitance sensor 334 having positive and negative electrodes 342, 344 in the form of adjacent in-plane electrode plates embedded within the substrate. The positive and negative electrodes 342, 344 meet at associated seams 360, such that separate parts 330a-330d formed on associated seams 360 produce an associated capacitance. In this example, each capacitance sensor 334 is electrically coupled directly to the voltage source 336 in a series circuit, such that the controller can determine the change of capacitance for the associated section of the print surface 308 and determine the failed bed adhesion of the specific parts. In another example, the capacitance sensors are arranged in a parallel circuit, with the positive electrode of each capacitance sensor connected to the positive terminal, and the negative electrode of each capacitance sensor connected to the negative terminal. For instance, as shown in FIG. 6, the rows of positive electrodes 442 can be connected in parallel to the voltage source 136, and the columns of negative electrodes 444 can be connected in parallel to the voltage source 136. It is contemplated that the matrix of capacitance sensors can be arranged in any suitable circuit.

In this example, the printer includes the user interface 158 for generating an all-continue command signal, a partial-stop command signal, and an all-stop command signal. The technician may operate the user interface 158 to generate the all-continue command signal in response to the technician determining that the defect of the part 130 associated with the error signal is repairable. The controller 152 can receive the all-continue signal from the user interface 158 for actuating the filament drive system 126, the nozzle, the XY-motor system 132, and the Z-motor system to continue printing all parts in response to the controller receiving the all-continue command signal from the user interface 158. Furthermore, the technician may also operate the user interface 158 to generate the partial-stop command signal in response to the technician determining that the defect associated with the error signal is not repairable. The controller 152 can receive the partial-stop signal from the user interface 158 and in turn actuate the filament drive system 126, the nozzle, the XY-motor system 132, and the Z-motor system to stop printing only the part associated with the error signal and continue printing the parts not associated with the error signal. In addition, the technician may operate the user interface 158 to generate the all-stop command signal. The controller 152 can receive the all-stop signal from the user interface 158 for actuating the filament drive system 126, the nozzle, the XY-motor system 132, and the Z-motor system 120 to stop printing all parts.

Referring to FIG. 6, another example of a print bed 406 is similar to the print bed 306 of FIG. 5 and includes similar components identified by the same reference numbers increased by 100. However, while the print bed 306 of FIG. 5 includes the plurality of capacitance sensors 334 for detecting a capacitance of multiple separate parts 330 adhered to associated sections 310 of the print surface 308, the plurality of capacitance sensors 434 for detecting a capacitance of single part 430 adhered to multiple sections 410 of the print surface CC.

Figure 7:
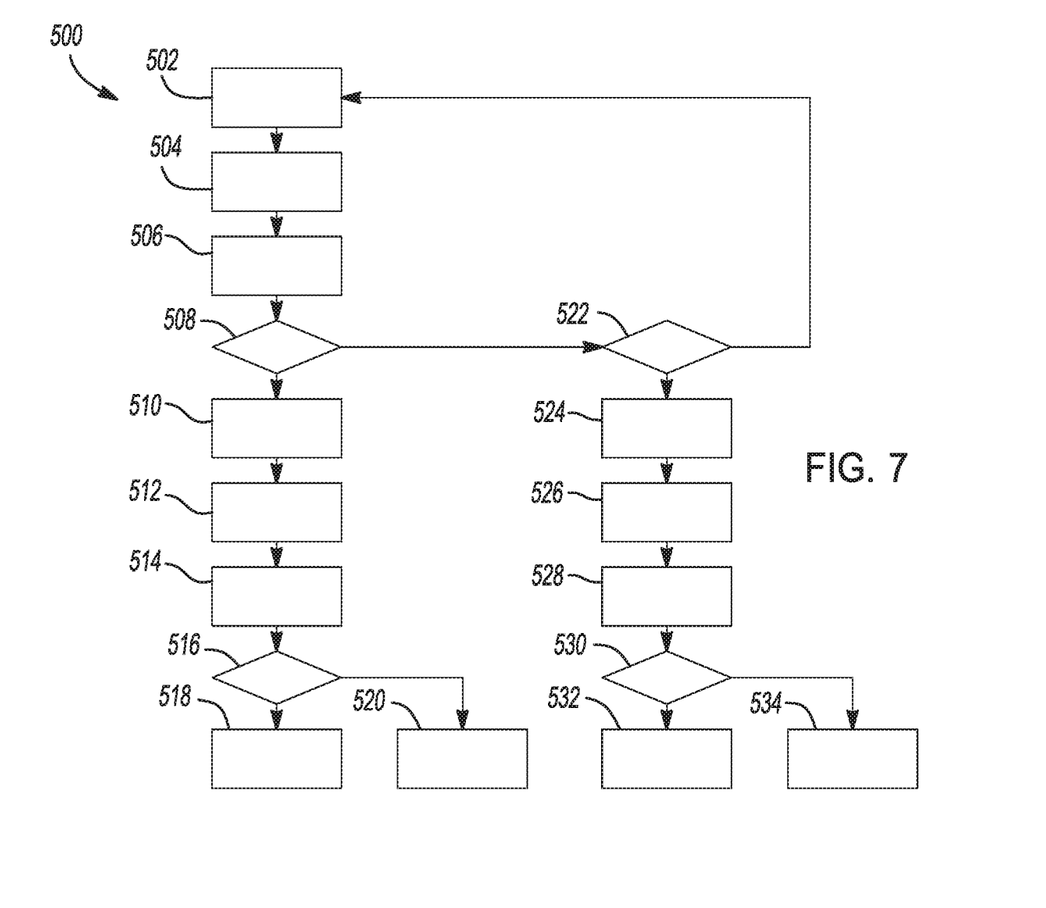
FIG. 7 is a flowchart of one exemplary method of operating the 3D printer of FIG. 1.

Referring now to FIG. 7, one example of a method 500 for operating the printer 100 of FIG. 1 with the print bed 406 of FIG. 6 is illustrated. The method 500 commences at block 502 with the filament drive system 126 supplying the filament 124 to the nozzle 128. In this example, the filament drive system 126 draws one or more filaments 124 from associated canisters 122 and supplying the filament 124 to the nozzle 128. In other examples, other devices can draw feedstock in any form from any suitable storage container to the nozzle.

At block 504, the XY-motor system 132 displaces the nozzle 128 along an X-axis and a Y-axis relative to the print surface 108 for melting and dispensing each layer of the filament 124 onto one or more sections of the print surface 108, and the Z-motor system 120 moves the print bed 106 along a Z-axis relative to the nozzle 128 when each layer is completed to form a dielectric part 130 on the print surface 108. In this example (FIG. 6), a single dielectric part 430 is formed on the print bed 406 and includes first and second portions 431a, 431b printed on associated first and second sections 410a, 410b of the print surface 408. In another example (FIG. 5), separate dielectric parts 330 can be formed on associated sections 310a, 310b of the print surface 308. Furthermore, it is contemplated that the print bed can be held in a fixed position, and the nozzle can be movable along the X, Y, and Z axes. It is also contemplated that the nozzle and print bed can be movable relative to one another with either one of the nozzle and print bed be movable in any suitable direction or held in a fixed position.

At block 506, the controller 152 and the capacitance sensors measure a capacitance for associated sections of the print surface during the print process. In one example (FIG. 6), a first capacitance sensor 434a measures the capacitance associated with the first section 410a of the print surface 408, and a second capacitance sensor 434b measures the capacitance associated with the second section 410b of the print surface 408. At each section 410a, 410b, the capacitance between the positive and negative electrodes 442, 444 when the dielectric part 430 is adhered to the seam 460 is higher than the capacitance when the dielectric part 430 is separated or spaced from the seam 460. For instance, the measured capacitance can be 120-140 picofarads when the portions 431a, 431b of the dielectric part 430 are adhered to the associated seams 460, and the measured capacitance can be 100 picofarads when the portions 431a, 431b of the dielectric part 430 is separated or spaced from the associated seams 460. It is contemplated that the measured capacitance can be above or below 120-140 picofarads when the dielectric part is adhered to the seam, and the measured capacitance can be above or below 100 picofarads when the dielectric part is separated or spaced from the seam 460.

At block 508, the controller 152 compares the measured capacitance at each section 410*a*, 410*b* of the print surface 408 to a previously measured capacitance at the same section to detect a change of capacitance when the associated portion 431*a*, 431*b* of the dielectric part 430 is displaced relative to the associated section 410*a*, 410*b* of the print surface 408. If the controller 152 determines that there is a change in capacitance for each of the first and second sections 410*a*, 410*b*, the method proceeds to block 510. Continuing with the previous example, if the controller 152 determines that the change of capacitance for each of the first and second sections 410*a*, 410*b* (FIG. 6) is equal to one another and above a threshold change of capacitance, the controller 152 determines that the single entire dielectric part 430 is displaced relative to the first and second sections 410*a*, 410*b* of print surface 408, and the method proceeds to block 510. In another example, the controller 152 can determine that two separate parts 330*a*, 330*b* (FIG. 5) are displaced relative to associated first and second sections 310*a*, 310*b* during the printing process, and the method proceeds to block 510. If the controller 152 determines that there is no change in capacitance for both of the first and second sections of the print surface, the method proceeds to block 522. Continuing with the previous example, if the controller 152 determines that the change of capacitance for at least one of the first and second sections 410*a*, 410*b* is below a threshold change of capacitance, the method can proceed to block 516.

At block 510, the controller 152 generates an error signal, indicating that the dielectric part or parts have entirely separated from the print surface. More specifically, the error signal may indicate that the part 430 (FIG. 6) previously printed on both of the first and second sections 410*a*, 410*b* has detached from or been displaced relative to the first and second sections 410*a*, 410*b* of the print surface 408. In another example, the error signal may indicate that two separate dielectric parts 330*a*, 330*b* (FIG. 5) previously printed on associated ones of the first and second sections 310*a*, 310*b* of the print surface 308 have detached from and been displaced relative to the first and second sections 310*a*, 310*b*.

At block 512, the filament drive system 126 ceases a supply of the filament 124 to the nozzle 128 in response to the filament drive system 126 receiving the error signal from the controller 152.

At block 514, the display device 156 displays an error message to notify a technician of the entire separation of the single dielectric part 430 (FIG. 6) from the first and second sections 410*a*, 410*b* of the print surface 408, or the separation of multiple separate parts 330 (FIG. 5) from the associated sections 310*a*, 310*b* of the print surface 308.

At block 516, the technician inspects the part associated with the notification displayed on the display device 156. If the technician determines that the part associated with the error signal has a defect that is repairable, the method proceeds to block 518. If the technician determines that the part associated with the error signal has defect that is not repairable, the method proceeds to block 520.

At block 518, the technician operates the user interface 158 to continue the printing process for the single part 430 associated with the error signal. In another example where the printer 100 is concurrently printing multiple parts, the technician operates the user interface 158 to continue the printing process for all parts 330*a*, 330*b*, including parts with repairable defects associated with the error signal and parts not associated with the error signal.

At block 520, the technician operates the user interface 158 to terminate the printing process for the single part 430 associated with the error signal. In another example where the printer 100 is printing concurrently printing multiple parts 330*a*, 330*b*, the technician operates the user interface 158 to terminate the printing process for the parts associated with the error signal and resume the printing process for the parts not associated with the error signal.

At block 522, the controller 152 determines that one of the first and second changes of capacitance associated with the first and second portions 431*a*, 431*b* of the print surface 408 is above a threshold change of capacitance when one of the first and second portions 431*a*, 431*b* of the dielectric part 430 is displaced relative to the print surface 108 during the printing process, and the method proceeds to block 518. If the controller 152 determines that the change of capacitance for each of the first and second sections 410*a*, 410*b* is below the threshold change of capacitance, the method returns to block 502.

At block 524, the controller 152 generates an error signal, indicating a partial separation of the portion of the single dielectric part 130 from the sections 110*a*, 110*b* of the print surface 408 associated with the error signal. In another example where multiple parts 330*a*, 330*b* are being printed, the error signal can indicate that multiple parts 330*a*, 330*b* have separated from the associated sections 410*a*, 410*b* of the print surface 408.

At block 526, the filament drive system 126 ceases a supply of the filament 124 to the nozzle 128 in response to the filament drive system 126 receiving the error signal from the controller 152.

At block 528, the display device 156 displays an error message to notify the technician of the partial separation of the single dielectric part 430 from the print surface 408 or, in another example, to indicate the separation of multiple separate parts 330*a*, 330*b* from associated sections 410*a*, 410*b* of the print surface 408.

At block 530, the technician inspects the part associated with the notification displayed on the display device 156. If the technician determines that the part associated with the error signal has a defect that is repairable, the method proceeds to block 532. If the technician determines that the part associated with the error signal has defect that is not repairable, the method proceeds to block 534.

At block 532, the technician operates the user interface 158 to continue the printing process for the single part 430 associated with the error signal. In another example where the printer 100 is concurrently printing multiple parts, the technician operates the user interface 158 to continue the printing process for all parts 330*a*, 330*b*, including parts with repairable defects associated with the error signal and parts not associated with the error signal.

At block 532, the technician operates the user interface 158 to terminate the printing process for the single part 430 associated with the error signal. In another example where the printer 100 is printing concurrently printing multiple parts 330*a*, 330*b*, the technician operates the user interface 158 to terminate the printing process for the parts associated with the error signal and resume the printing process for the parts not associated with the error signal.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A three-dimensional printer comprising:
    an enclosure defining a chamber;
    a print surface disposed within the chamber;
    a nozzle displaceable relative to the print surface for melting and dispensing a filament on the print surface to form a dielectric part during a printing process;
    a filament drive system for supplying the filament to the nozzle;
    at least one capacitance sensor coupled to the print surface;
    a controller electrically coupled to the at least one capacitance sensor for measuring a capacitance during the print process, the controller determining a change of capacitance in response to the dielectric part being displaced relative to the print surface during the printing process, and the controller generating an error signal in response to the controller determining the change of capacitance; and
    a display device electrically coupled to the controller and displaying an error message in response to the display device receiving the error signal from the controller.

2. The three-dimensional printer of claim 1 wherein the filament drive system is electrically coupled to the controller, and the filament drive system ceases supplying filament to the nozzle in response to the filament drive system receiving the error signal from the controller.

3. The three-dimensional printer of claim 2 wherein the controller is configured to generate the error signal in response to the controller determining that the change of capacitance is above a predetermined threshold.

4. The three-dimensional printer of claim 3 wherein the controller is configured to not generate the error signal in response to the controller determining that the change of capacitance is less than the predetermined threshold.

5. The three-dimensional printer of claim 4 wherein the at least one capacitance sensor comprises:
    a voltage source;
    a positive electrode coupled to the voltage source and receiving a positive charge from the voltage source; and
    a negative electrode coupled to the voltage source and receiving a negative charge from the voltage source.

6. The three-dimensional printer of claim 5 wherein each of the positive electrode and the negative electrode includes a plurality of fingers, with the fingers of the positive electrode being interdigitated with the fingers of the negative electrode.

7. The three-dimensional printer of claim 6 wherein the positive and negative electrodes are embedded within a substrate disposed between two composite layers, with one of the composite layers including the print surface.

8. The three-dimensional printer of claim 7 wherein the controller includes an analog-to-digital converter coupled to the plurality of capacitors.

9. A three-dimensional printer comprising:
    an enclosure defining a chamber;
    a print surface disposed within the chamber and having a plurality of sections;
    a nozzle displaceable relative to the print surface for melting and dispensing a filament on the plurality of sections of the print surface to form at least one dielectric part during a printing process;
    a filament drive system for supplying the filament to the nozzle;
    a plurality of capacitance sensors coupled to the associated plurality of sections of the print surface;
    a controller electrically coupled to the plurality of capacitance sensors for measuring a capacitance for the associated sections of the print surface during the print process, the controller determining a change of capacitance in response to the associated portion of the dielectric part being displaced relative to the associated section of the print surface during the print process, and the controller generating an error signal in response to the controller detecting the change of capacitance; and
    a display device electrically coupled to the controller and displaying an error message in response to the display device receiving the error signal from the controller.

10. The three-dimensional printer of claim 9 wherein the plurality of capacitance sensors are arranged in a parallel circuit that comprises:
    a voltage source having a positive terminal and a negative terminal; and
    a plurality of capacitors connected to one another in parallel, with each of the capacitors having a positive electrode connected to the positive terminal and a negative electrode connected to the negative terminal.

11. The three-dimensional printer of claim 9 wherein each of the positive electrode and the negative electrode includes a plurality of fingers, with the fingers of the positive electrode being interdigitated with the fingers of the negative electrode.

12. The three-dimensional printer of claim 9 wherein the positive and negative electrodes are embedded within a substrate disposed between two composite layers, with one of the composite layers including the print surface.

13. The three-dimensional printer of claim 12 wherein the controller includes an analog-to-digital converter coupled to the plurality of capacitors.

14. The three-dimensional printer of claim 9 wherein the plurality of capacitors are arranged in a matrix that includes the positive electrodes arranged in a plurality of rows and the negative electrodes arranged in a plurality of columns intersecting the rows.

15. A method of operating a three-dimensional printer having an enclosure, a print surface disposed within the enclosure, a nozzle, a filament drive system, at least one capacitance sensor, a controller electrically coupled to the at least one capacitance sensor, and a display device, the method comprising:
    supplying, using the filament drive system, a filament to the nozzle;
    displacing the nozzle relative to the print surface for melting and dispensing the filament to form a dielectric part on the print surface during a printing process;
    measuring, with the controller and the at least one capacitance sensor, a capacitance during the print process;
    determining, using the controller, a change of capacitance in response to the dielectric part being displaced relative to the print surface during the printing process;
    generating, using the controller, an error signal in response to the controller determining the change of capacitance during the printing process; and
    displaying, using the display device, an error message in response to the display device receiving the error signal from the controller.

16. The method of claim 15 further comprising the filament drive system ceasing a supply of the filament to the nozzle during the printing process in response to the filament drive system receiving the error signal from the controller.

17. The method of claim 16 further comprising the controller generating the error signal in response to the controller determining that the change of capacitance is above a predetermined threshold.

18. The method of claim 17 further comprising the controller not generating the error signal in response to the controller determining that the change of capacitance is less than the predetermined threshold.

19. The method of claim 15 further comprising:
measuring the capacitance associated with first and second portions of the print surface during the print process;
determining, using the controller, one of the first and second changes of capacitance associated with the first and second portions of the print surface in response to a portion of the dielectric part being displaced relative to the print surface during the printing process; and
generating, using the controller, the error signal indicating a partial separation of the dielectric part in response to the controller determining that one of the first and second changes of capacitance is above a threshold change of capacitance.

20. The method of claim 19 further comprising:
determining, using the controller, a common change of capacitance associated with the first and second portions of the print surface in response to an entirety of the dielectric part being displaced relative to the print surface during the printing process; and
generating, using the controller, the error signal indicating an entire separation of the dielectric part in response to the controller determining the common change of capacitance associated with the first and second portions of the print surface.

* * * * *